(12) United States Patent
Keats

(10) Patent No.: US 8,261,913 B2
(45) Date of Patent: Sep. 11, 2012

(54) STACKABLE PLANT POT

(76) Inventor: John Rodney Keats, Lambton (AU)

( * ) Notice: Subject to any disclaimer, the term of this patent is extended or adjusted under 35 U.S.C. 154(b) by 0 days.

(21) Appl. No.: 12/307,288

(22) PCT Filed: Aug. 31, 2007

(86) PCT No.: PCT/AU2007/001422
§ 371 (c)(1),
(2), (4) Date: Jan. 2, 2009

(87) PCT Pub. No.: WO2008/025103
PCT Pub. Date: Mar. 6, 2008

(65) Prior Publication Data
US 2010/0000896 A1 Jan. 7, 2010

(30) Foreign Application Priority Data
Jul. 3, 2006 (AU) ................. 2006903563

(51) Int. Cl.
B65D 85/50 (2006.01)
A01G 9/02 (2006.01)
A01G 25/00 (2006.01)

(52) U.S. Cl. ................. 206/423; 47/71; 47/82

(58) Field of Classification Search ........... 47/84, 86, 47/82, 83, 71, 79, 80, 65.5, 66.1, 66.5; 206/423, 206/566
See application file for complete search history.

(56) References Cited

U.S. PATENT DOCUMENTS

| 2,781,651 A | * | 2/1957 | Cutler ............... 248/346.11 |
| 2,799,972 A | * | 7/1957 | Teixeira ............... 47/86 |
| 3,137,095 A | * | 6/1964 | Pearson ............... 47/83 |
| 3,686,024 A | * | 8/1972 | Nankee et al. ............... 42/158 |
| 3,959,569 A | * | 5/1976 | Burkholder, Jr. ............... 428/479.6 |
| 4,171,593 A | * | 10/1979 | Bigglestone ............... 47/79 |
| 4,318,248 A | * | 3/1982 | Muldner ............... 47/56 |
| 4,419,843 A | * | 12/1983 | Johnson, Sr. ............... 47/82 |
| 4,614,056 A | * | 9/1986 | Farkas ............... 47/67 |
| 5,155,934 A | * | 10/1992 | Leider ............... 47/86 |
| 5,226,255 A | * | 7/1993 | Robertson ............... 47/56 |
| 5,309,671 A | * | 5/1994 | Byun ............... 47/83 |
| 5,309,673 A | * | 5/1994 | Stover et al. ............... 47/59 R |
| 5,466,731 A | * | 11/1995 | Akers et al. ............... 524/52 |
| 5,607,550 A | * | 3/1997 | Akers ............... 162/102 |
| D382,512 S | * | 8/1997 | Hulsebus ............... D11/152 |
| 5,761,847 A | * | 6/1998 | Ito et al. ............... 47/65.8 |
| 5,829,193 A | * | 11/1998 | Otake et al. ............... 47/65.8 |
| 5,870,855 A | * | 2/1999 | Hougaard ............... 47/65.5 |
| 5,887,382 A | * | 3/1999 | Marshall et al. ............... 47/56 |

(Continued)

FOREIGN PATENT DOCUMENTS
AU 634522 8/1991
(Continued)

OTHER PUBLICATIONS
International Search Report: PCT/AU2007/001422.

Primary Examiner — J. Gregory Pickett
Assistant Examiner — Kaushikkumar Desai
(74) Attorney, Agent, or Firm — Ladas & Parry LLP

(57) ABSTRACT

A stackable plant pot including a cavity provided with water flow directing gutters, a recesses centrally located water catchment region with drainage slits and suited to receive a moisture retaining device, and a soil holding region located above the water catchment region.

18 Claims, 16 Drawing Sheets

U.S. PATENT DOCUMENTS

| | | | |
|---|---|---|---|
| 5,946,854 A * | 9/1999 | Guillemain et al. | 47/65.9 |
| 6,125,579 A * | 10/2000 | Pavelka | 47/79 |
| 6,134,832 A * | 10/2000 | Bokmiller et al. | 47/66.1 |
| 6,182,394 B1 * | 2/2001 | Bassler | 47/65.5 |
| 6,526,693 B2 * | 3/2003 | Cochran | 47/66.5 |
| 6,993,869 B2 | 2/2006 | Waters | |
| 7,043,877 B1 | 5/2006 | Jensen | |
| 7,690,150 B2 * | 4/2010 | Orschulik | 47/66.1 |
| 2004/0211118 A1 * | 10/2004 | Smith et al. | 47/66.5 |
| 2007/0180766 A1 | 8/2007 | Wilkes | |

FOREIGN PATENT DOCUMENTS

| | | |
|---|---|---|
| AU | 726469 B2 | 12/1998 |
| EP | 0142471 A2 | 5/1985 |
| JP | 2003-230319 A | 8/2003 |
| WO | 2005/015976 A1 | 2/2005 |

* cited by examiner

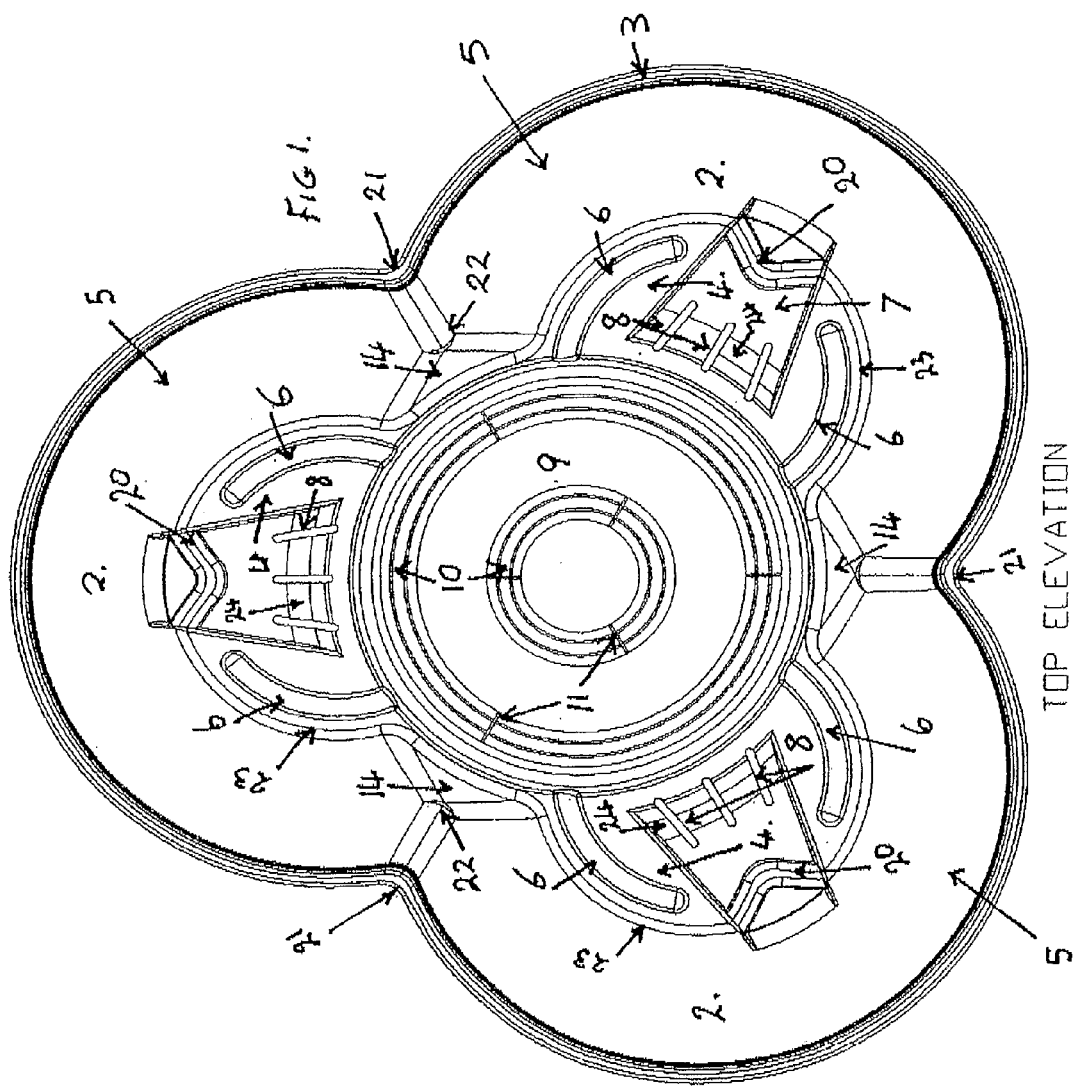

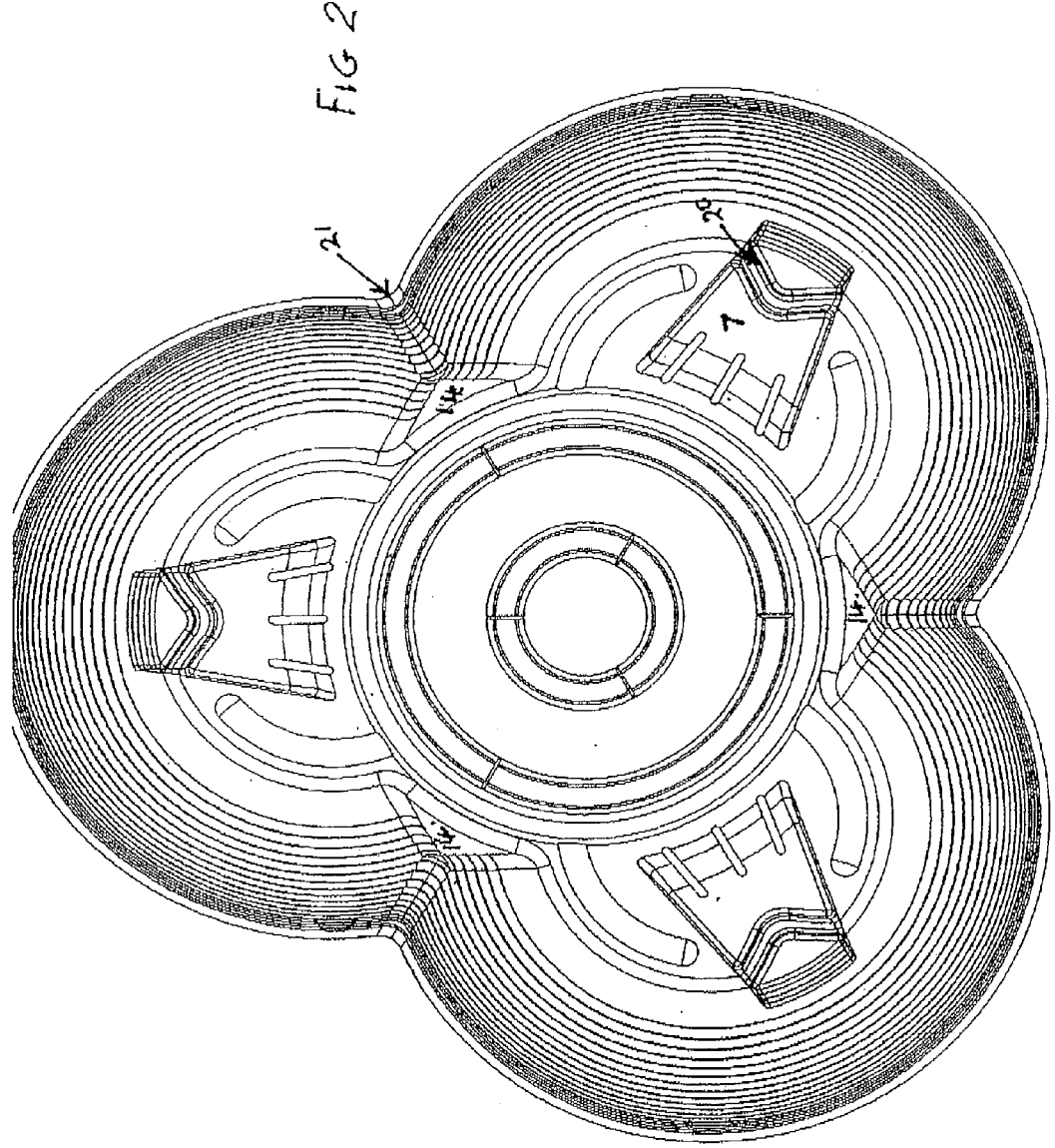

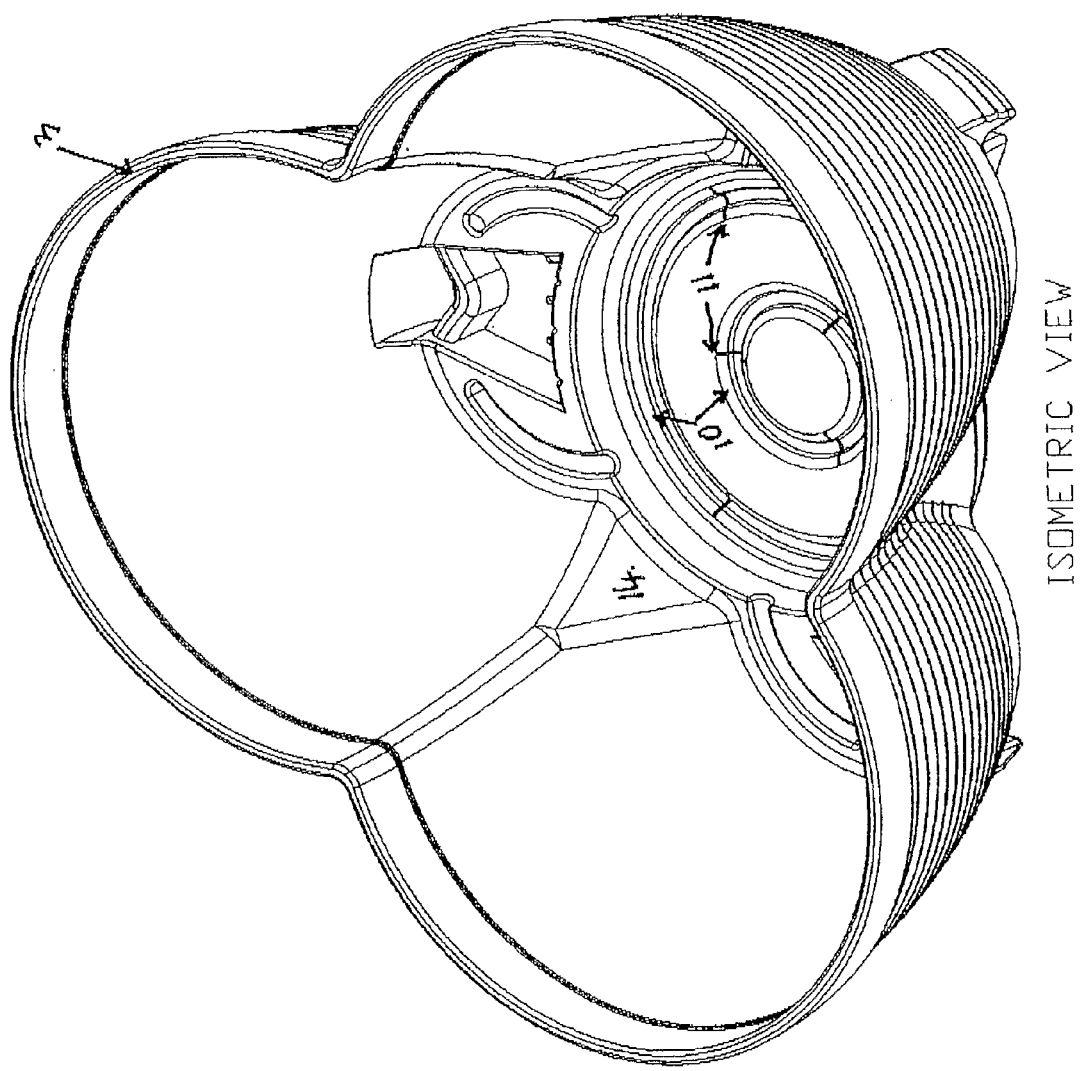

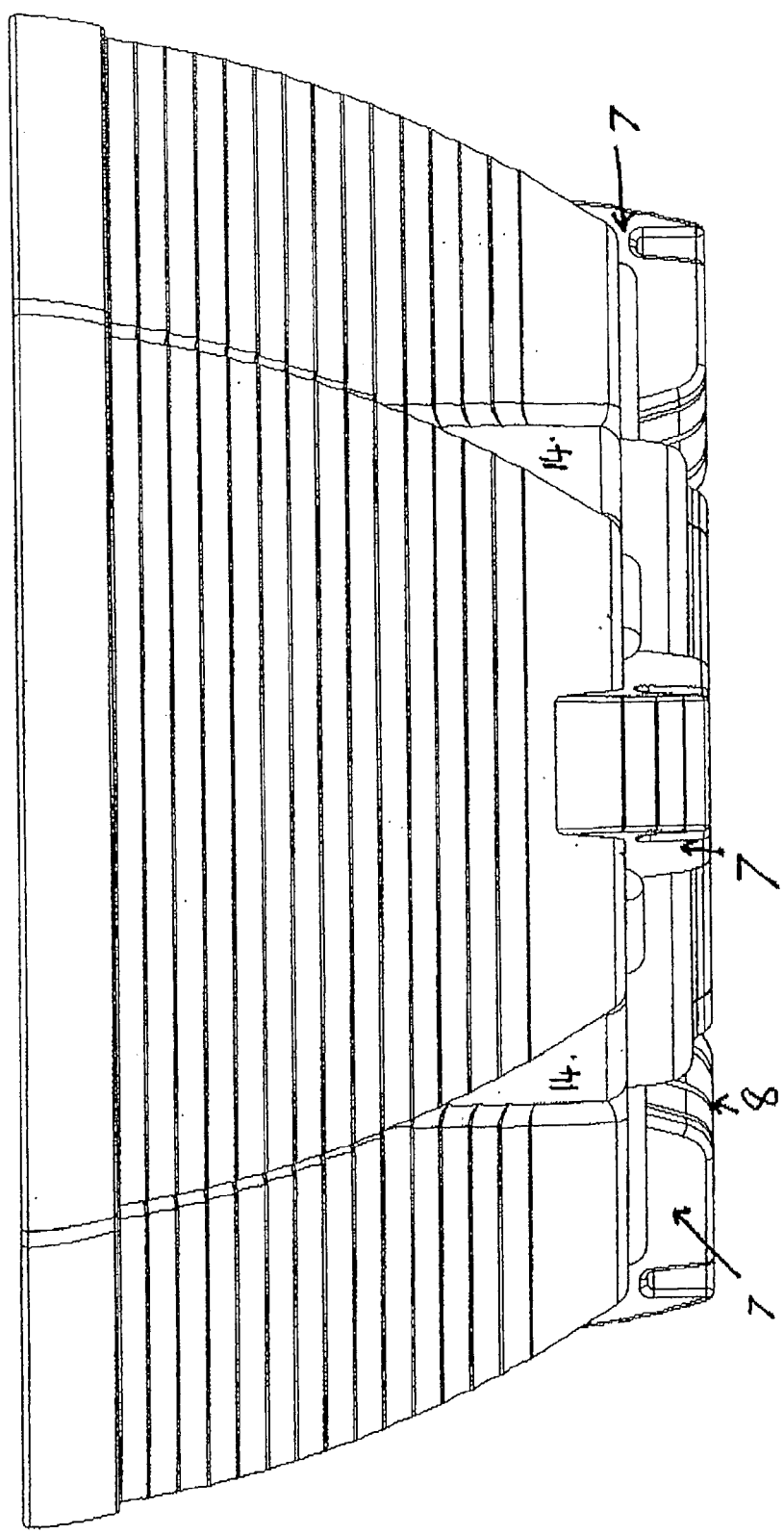

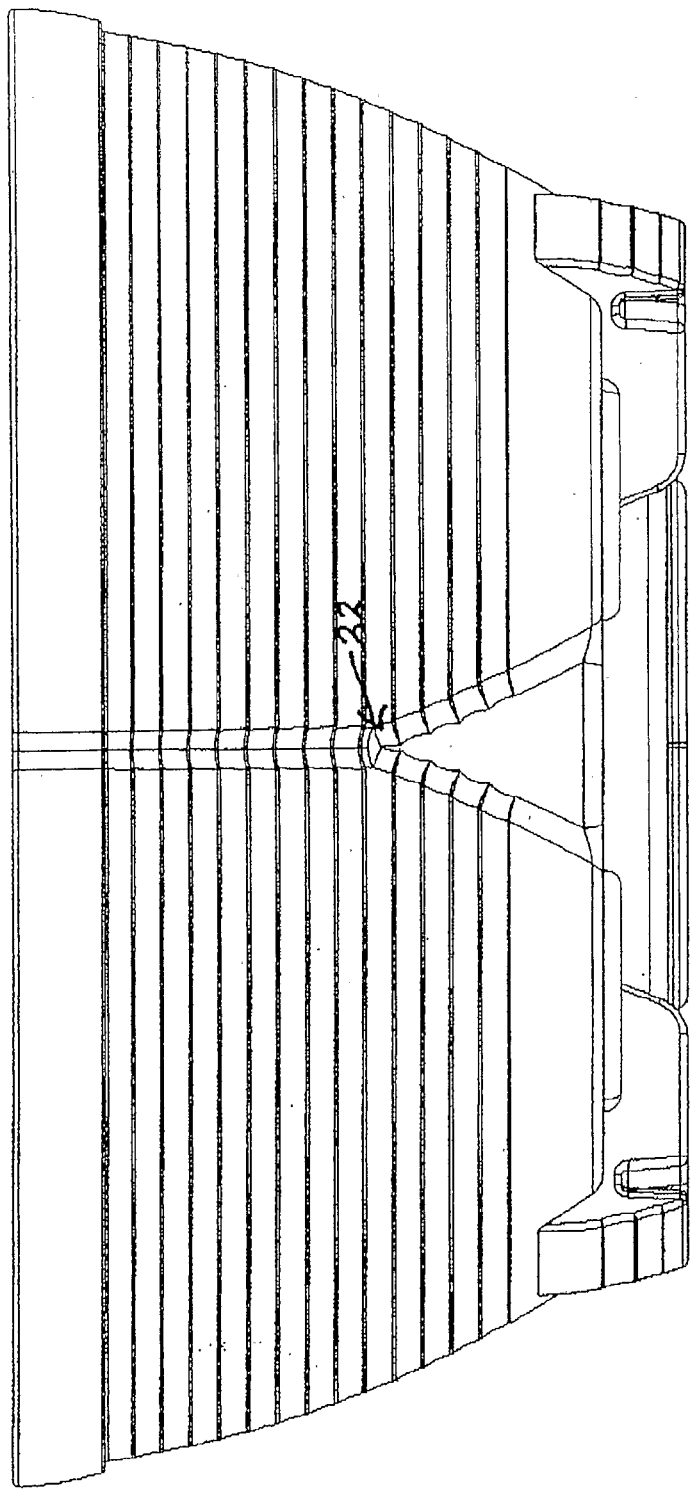

SIDE VIEW MIRROR LEFT/RIGHT

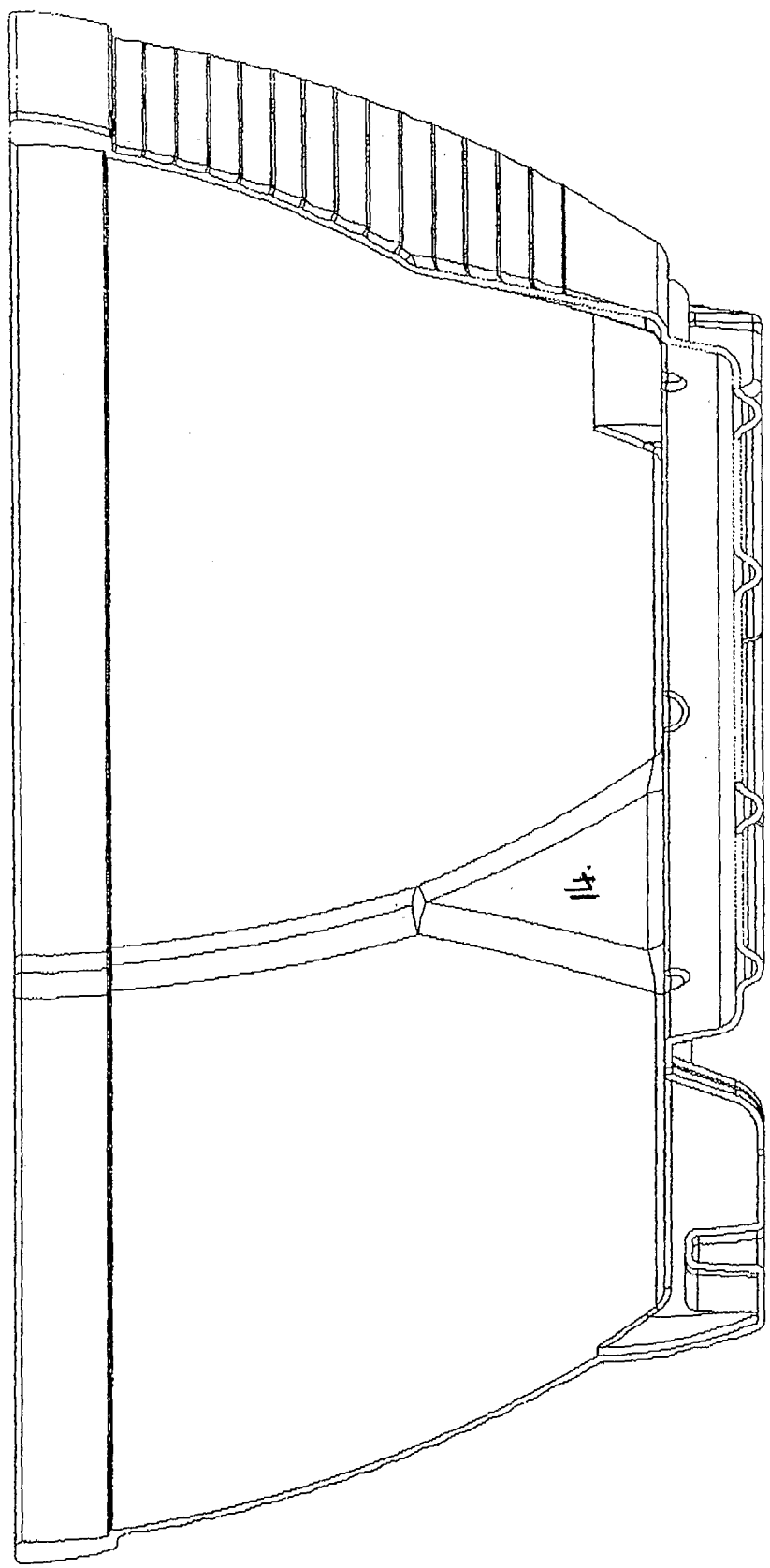

CROSS-SECTION SIDE VIEW OF POT MAT FITTED DRY STATE

Cross section side view Mat fitted water activated

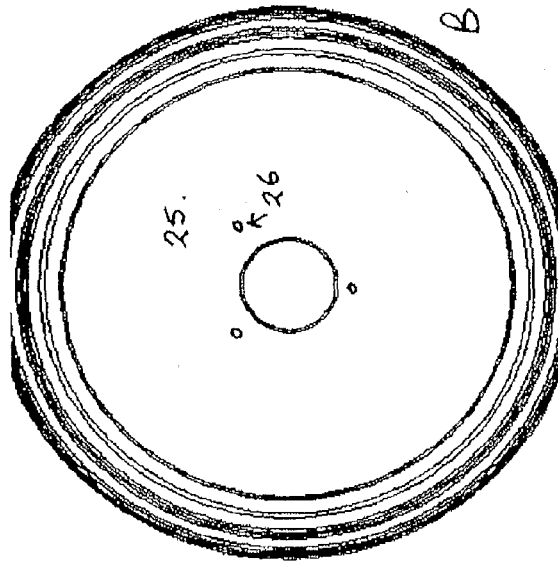
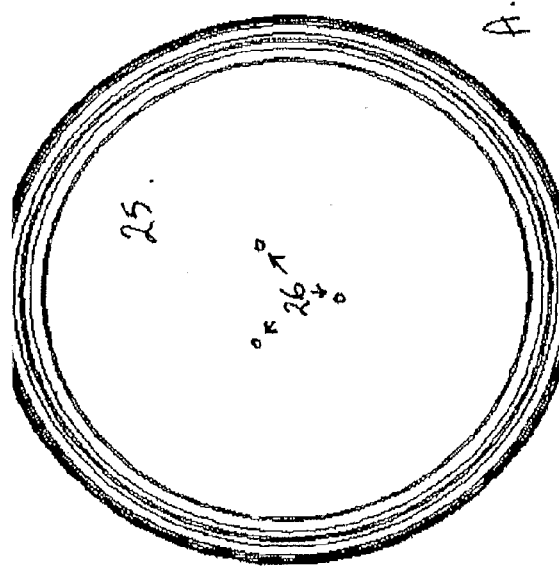
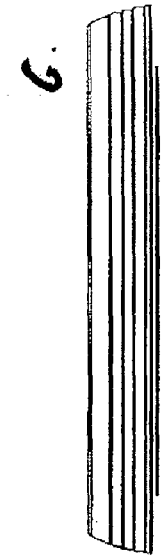
FIG. 10.

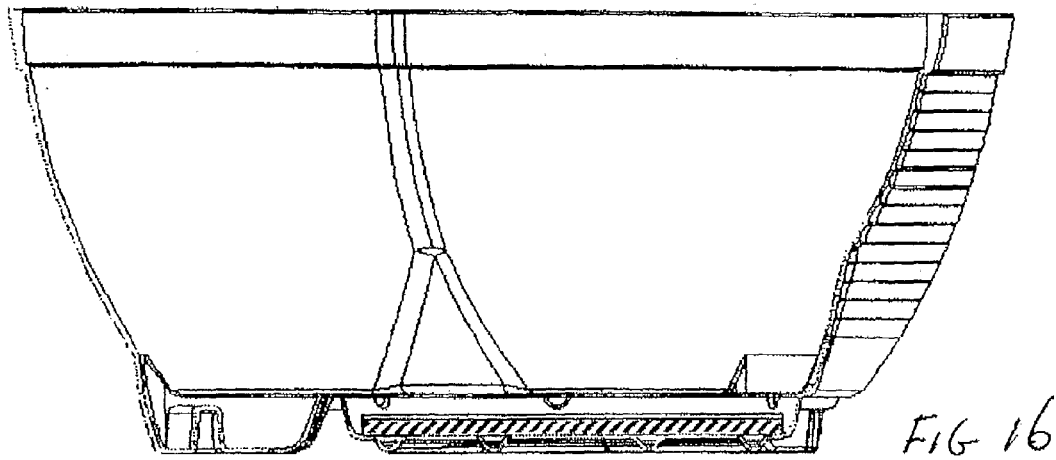
CROSS-SECTION SIDE VIEW OF POT MAT FITTED DRY STATE
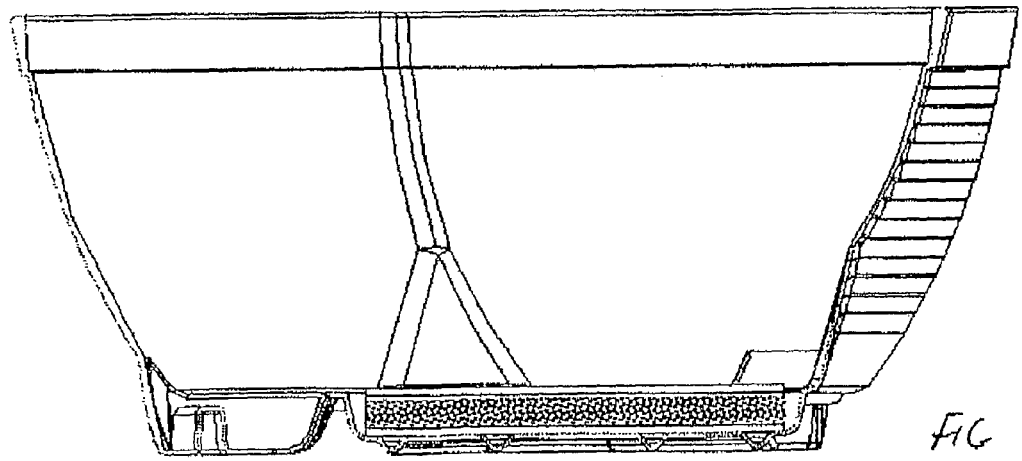
CROSS-SECTION SIDE VIEW MAT FITTED WATER ACTIVETED

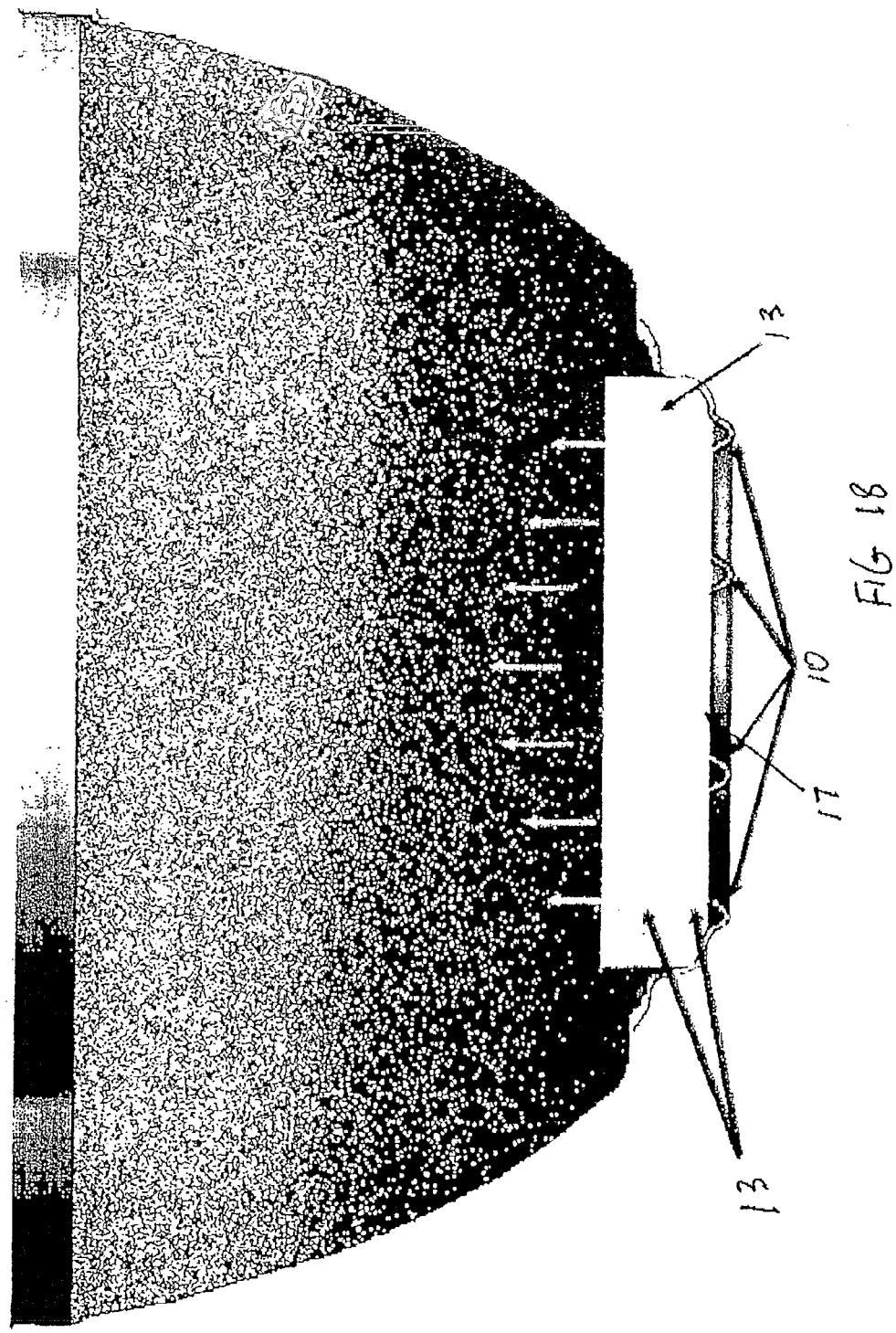

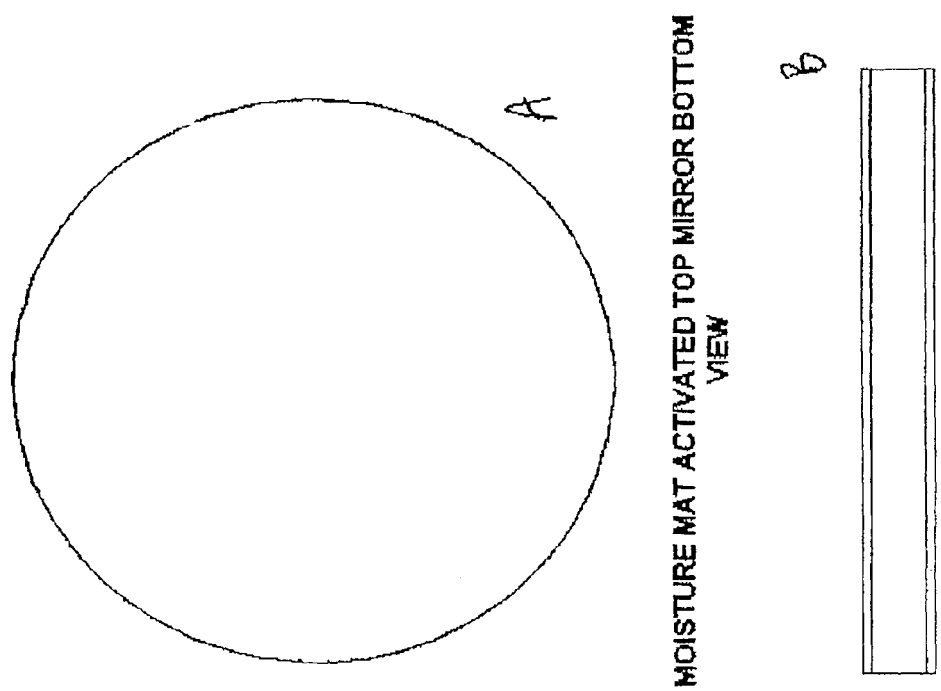

STACKABLE PLANT POT

TECHNICAL FIELD

The present invention relates to a stackable plant pots and, in particular to a stackable plant pot.

BACKGROUND

Various forms of plant pots are known for growing plants. Typical plant pots are either of generally cylindrical, frustoconical or rectangular prism form. Frustoconical type plant pots, or other plant pots which are tapered so that the bottom of each pot is narrower than the top, are advantageous over cylindrical or rectangular prism type pots in that they are often able to be located at least partially within each other and thereby able to be stacked for transport, storage and display, thereby realising considerable space savings. Generally, however, such plant pots can not be stacked-one on top of another-in any suitable manner for use. Many pot plant enthusiasts like to arrange several pots in a generally vertical relationship for particular aesthetic appeal and saving of space. Such an arrangement currently typically depends on use of a separate stand to mount the pots or the hanging of one pot from another with chains or the like.

Several attempts have been made to provide pots. One such attempt is disclosed in Australian patent no. 634522 in the name of Gromax Systems, Inc. This patent discloses a multiplicity of plant pots having an essentially square-shaped cross section. The plant pots can be stacked on top of one another by having each plant pot rotated approximately 45 degrees about a common axis relative to an adjacent plant pot. The adjacent plant pots are seated one on top of the other, consequently requiring that the individual plant pots (particularly those located towards the bottom) are particularly strong and rigid. This arrangement provides' only a very small area for growing plants, namely, the small corner portions which protrude beyond the pot immediately above. Also, this arrangement of plant pots is not adapted to be hung or suspended.

Australian patent no. 586493, in the name of Steven Fraknoi, also discloses an arrangement of stacked plant pots. Each pot is adapted to be seated upon a pot located immediately beneath it. In order to support the weight of a series of stacked pots, each individual pot must be particularly strong so that pots near the base of the arrangement are not squashed or deformed. Also, the particular design and construction of each individual pot is quite complex and it would be difficult and expensive to manufacture.

European patent no. 0 142 471, in the name of Werner Gerber, discloses a plant pot adapted to be stacked one on top of another. The plant pot of this disclosure is relatively flimsy and the stacking of 3 or more plant pots (especially if they contain soil) is likely to cause the lower pots in the arrangement to collapse or deform. The pots of this disclosure have connecting means comprising protruding tabs extending from an upper rim of each pot for insertion in a corresponding slot in a base of an adjoining pot. This arrangement for connecting adjacent pots is awkward for a user, given the relatively small sizes of the corresponding protrusions and slots. The arrangement also provides no added strength to the arrangement of pots.

International patent application no. PCT/AU98/00432 discloses a plant pot which, in use, is adapted to be stacked with one or more other similar plant pots. The relevant plant pot includes an upper rim made up of lobe rims and bridge rims, a base portion and a surrounding wall extending between the upper rim and the base portion, shaped so as to define a plurality of radially extending lobe sections. The base portion includes a recess (eg channel) formed in an underside of each lobe section. The upper rim and the recesses (eg channels) are configured in such a way that, when 2 or more plant pots are stacked, the rim and the recesses of adjoining plant pots inter-engage to hold the plant pots firmly in place. In the particular arrangement described, the recesses in the base portion are adapted to overlie portions of the upper rim thereby holding adjoining plant pots in position and, at the same time, providing a substantial degree of structural rigidity of the stack of plant pots.

The stack of pots disclosed in PCT/AU98/00432 is structurally very strong owing to the configuration of the rim and the recesses and to the manner in which these inter-engage. The lobe sections of adjoining plant pots are off-set so that a lobe section of one plant pot does not obstruct a lobe section of a plant pot immediately beneath it.

International patent application PCT/AU2004/001095 discloses a plant pot which, in use, is adapted to be stacked with one or more similar plant pots, the plant pot comprising: a cavity including a water reservoir region and a soil holding region located above the reservoir region including a separation means adapted to separate the reservoir region from the soil holding region it also discloses an overflow outlet in the reservoir region adapted to enable excess water to flow over a dam wall and out the reservoir region.

The stack of pots disclosed in PCT/AU2004/001095 does address the need for the storage of water in each stackable plant pot however it does have a few deficiencies. One of the deficiencies in this prior art is that there is no provision in each plant pot to specifically direct the flow of water to the reservoir region and in effect water may pass by the water reservoir region and through the overflow drainage holes not filling the reservoir region efficiently if at all.

International patent application PCT/AU2004/001095 also refers to the use of wicks as a means to transport water from the water reservoir region to the soil region and the only connection between the water reservoir and the root zone of the growing plants.

Usually these means work very favourably for small pots however with larger pots wicks have been found to be very ineffective providing insufficient surface area of moisture transferal for the larger volume of soil to draw upon via the soils own capillary action.

One further deficiency found accordingly unless the stackable plant pots when positioned in their stacked formation are perfectly perpendicular portions of the radially extending sections of the water reservoir area may never fill and render the wicks in these portions less effective or useless.

Accordingly, this invention is directed towards solving these inadequacies with a stackable plant pot which, following watering, are adapted to purposely direct the flow and retain a desired amount of water within a catchment area of each plant pot forming the stack for a controlled period of time so as the flow of water is inhibited sufficiently to timely allow a moisture retaining device in the form of a super absorbent mat located in a recessed central cavity of the catchment area and working in co-operation with each stackable plant pot to fully absorb water and soluble nutrients to its maximum moisture holding ability and transfer these reserves back to the soil when required efficiently over an extended period of time and regardless whether or not the pots in their stacked formation are perfectly perpendicular.

SUMMARY OF INVENTION

According to a first aspect of this invention, there is provided a plant pot which, in use, is adapted to be stacked with one or more similar plant pots, said plant pot comprising: a cavity with three radially located lobed sub-cavity sections supporting a series of water flow directing gutters, a water flow inhibiting centrally located catchment region, a moisture retaining device and hereafter referred to as a moisture retaining mat working in co-operation with the plant pot and a soil holding region located above said moisture retaining mat.

The three radially aligned lobed cavity regions converge with a central cavity located immediately above a downward formed recessed water catchment region and become one. The plant pot provides a series of drainage holes through the bottom walls of interconnecting cavities positioned on the base of the radially aligned lobed cavity sections for rapid release of excess water, these interconnecting cavities will be referred to as pot legs hereafter, and have no direct connection with the said catchment region. The plant pot also provides drainage gutters incorporating time controlled water flow inhibiting drainage slits within the catchment region.

The water catchment region is laterally defined by a side wall or walls of a downward formed recess centrally located in the bottom of the plant pot cavity, within the laterally aligned bottom wall of recessed catchment region is a series of depressions forming gutters with each gutter supporting a plurality of time controlled water flow inhibiting drainage holes. Said time controlled water flow inhibiting drainage holes are narrowed slits through the wall of these catchment region drainage gutters allowing a timely inhibited transfer of excess water to escape the catchment region in order to allow the moisture retaining mat working in co-operation with the plant pot sufficient time to fully absorb to the extent of its capability the maximum amount of storable water.

The water catchment region provides useable area for the moisture retaining mat to seat securely extending across the entire laterally defined bottom surface of the recess forming the water catchment region but above the catchment region drainage gutters allowing no obstruction of the flow inhibited drainage holes.

The purpose of the moisture retaining mat is to store the maximum amount of moisture for an extended period of time and transfer that moisture back into the soil region as the soil draws on this reserve by its own capillary action when needed.

The moisture mat provided may be constructed of any substance or materials that possess super absorbent properties and is provided with an outer skin that has excellent moisture transferring qualities.

In a preferred embodiment of the moisture retaining mat the use of fine grade Potassium Cross-linked Acrylamide Acrylate Co-polymer Gel Crystals impregnated into a non-woven absorbent fibrous inner core which is laminated between two super absorbent outer linings of a resilient material that has excellent moisture transferring qualities.

The fine grade Potassium Cross-linked Acrylamide Acrolith Co-polymer Gel Crystals are super absorbent and can swell to 200 to 400 times their dry state with stored water. The moisture mat will be provided with an add rate of these of fine grade Potassium Cross-linked Acrylamide Acrylate Co-polymer Gel Crystals to exactly expand the moisture retaining mat to a depth of the recessed centrally located water catchment region with stored water and as a result provide an enormous expanse of moisture transferring surface spanning the entire water catchment area.

In a particular preferred embodiment the plant pot is provided with three interconnecting radially aligned lobed sections. Each lobe section preferably defines a (bowl Shaped) sub-cavity of the cavity of the plant pot. Each sub-cavity is preferably in open communication with a central cavity region. and a pot leg region, wherein each lobe section includes a base portion and located on the lower edge and in an underside of said base portion is positioned a box like structure to form the pot leg.

On the underside of this pot leg is a recess and correspondingly at the point of interconnection on the edge of the upper lobed cavity sections includes a broadened wall area forming a thickened rim adapted to be received within the recess on the pot leg section of an upper adjacent plant pot. In this embodiment, a plurality of the plant pots of this invention are adapted to be stacked so that, in use, the lobe sections of adjoining plant pots are offset.

The broadened wall thickness of the upper lobed sections extends the entire way around the upper rim of the overall cavity forming a strong lip to accept the weight of pots stacked above it. In addition further strengthening is created at the interconnection point where the side walls of the radially aligned lobed cavity sections meet the central cavity wall section creating a strengthening brace at that significant stress point.

In the preferred embodiment there is provided water flow direction gutters formed by depressions in the internal base portions of the radially aligned lobed sections sub-cavities adjacent to the internal connection between each lobed section sub-cavity and the internal interconnecting cavity formed by each pot leg.

These water flow direction gutters follow the contoured edge of the internal base portion of the radially aligned lobed sections sub-cavities and following watering of the plant pot the flow of water is received from the internal wall of the radially aligned lobed sections sub-cavities and directed towards the centrally located recessed water catchment region via the water flow directing gutters.

As a consequence the centrally located recessed water catchment region fills with water activating the moisture retaining mat to absorb as much moisture as it can store and expand to a height consistent with the side wall defining the centrally located recessed water catchment region with excess water spilling back out of the catchment region into the water flow directing gutters. and forcing the excess water to then overflow into the internal cavities of the pot legs. Here the excess water will then be released from the pots through the rapid release drainage holes located and passing through the most inner side wall of the pot legs.

Whatever excess water remains in the centrally located recessed water catchment region will be flow inhibited and totally released in a timely fashion after maximum absorption of the moisture retaining mat.

In a further preferred embodiment, the stack of plant pots further comprises the saucer plate adapted to accept the lowermost plant pot of said stack.

Typically this saucer plate will have water retaining capabilities suited for indoor gardening however the saucer plate has easily removable blind drainage holes and will allow full drainage to suit gardening outdoors and prevent the build up of unwanted surplus drainage that may encourage mosquito breeding.

In its entirety the invention encompasses one or more stackable plant pots in their staked positions each providing a plurality of water flow direction gutters, a centrally located recessed water catchment region, a plurality of water catchment drainage gutters supporting a plurality of time controlled water flow inhibited drainage slits, a moisture retaining mat seated on the internal laterally defined base portion of the centrally located recessed water catchment region to each stacked pot and one saucer plate with removable drainage holes seated under the lowermost stacking pot to form this moisture retaining stackable planting system.

BRIEF DESCRIPTION OF THE DRAWINGS

In order that the present invention may be more clearly understood, preferred embodiments will be described with reference to the following figures.

FIG. 2 is a bottom view of the plant pot of FIG. 1

FIG. 3 is a top perspective view of the plant pot of FIG. 1

FIG. 5 is a front view of plant pot of FIG. 1.

FIG. 6 is a back view of the of plant pot of FIG. 1.

FIG. 7 is a side view mirror left and right of the plant pot of FIG. 1.

FIG. 8 is a side cross-sectional view of a plant pot according to a preferred embodiment of this invention.

FIGS. 10 A,B and C depicts the top, bottom and side views of a saucer adapted to receive a pot or stack of pots according to a preferred embodiment of this invention.

FIGS. 10 D and E depicts the side and side cross-sectional view of two saucers adapted to receive a pot or stack of pots in storage mode according to a preferred embodiment of this invention.

FIG. 16 shows a Cad drawing of an isometric cross-sectional view of plant pot of FIG. 1 fitted with a moisture retaining mat dry state according to a preferred embodiment of this invention.

FIG. 17 shows a Cad drawing of a side cross-sectional view of plant pot of FIG. 1 fitted with a moisture retaining mat in its water activated state according to a preferred embodiment of this invention.

FIG. 18 shows a Cad drawing of a top view of plant pot of FIG. 1 fitted with a moisture retaining mat dry state according to a preferred embodiment of this invention.

FIGS. 19 A, B and C a top, side and isometric view of a moisture retaining mat dry state according to a preferred embodiment of this invention.

DESCRIPTION OF PREFERRED EMBODIMENTS

Figure 4:
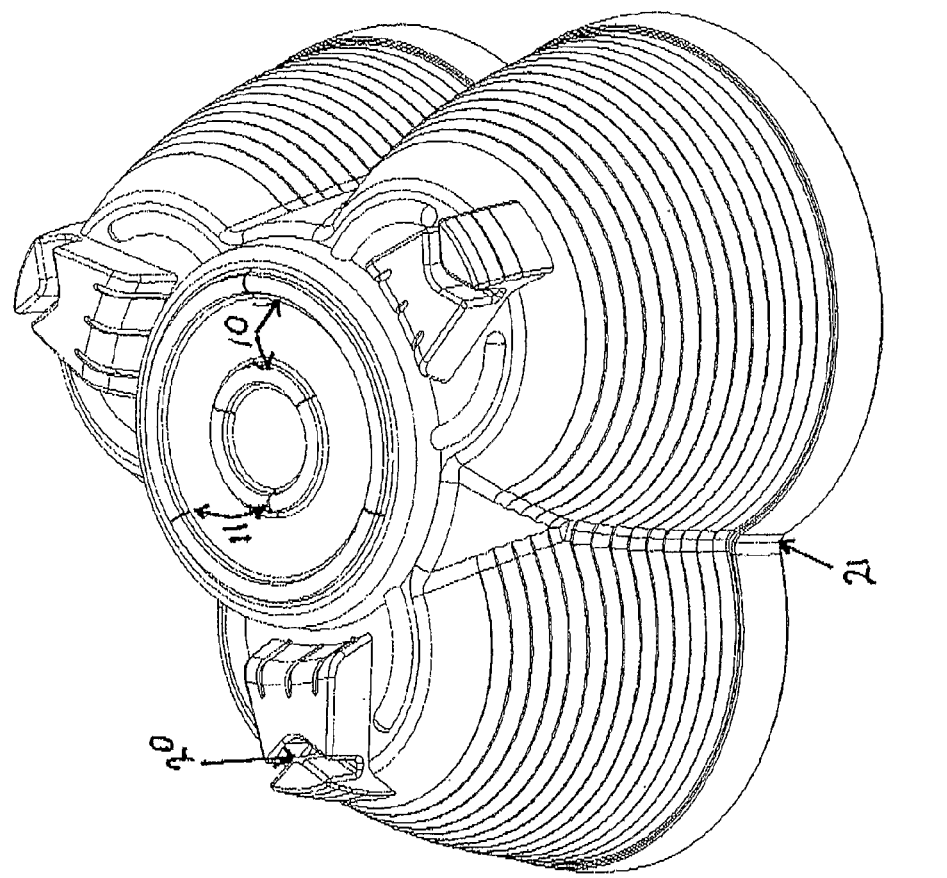
FIG. 4 is a bottom perspective view of the plant pot of FIG. 1
Figure 1:
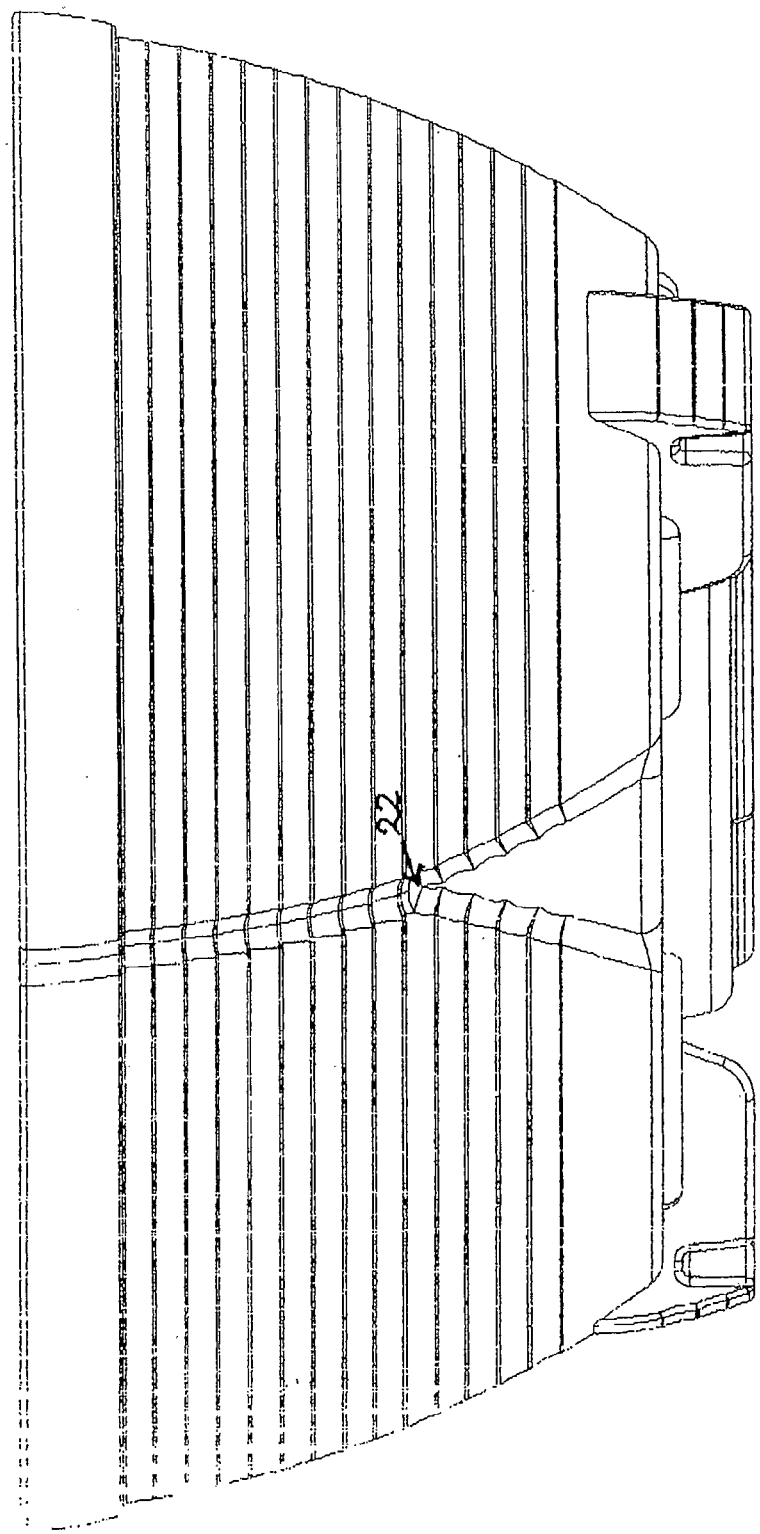
FIG. 1 is a top view of the plant pot.
Figure 9A:
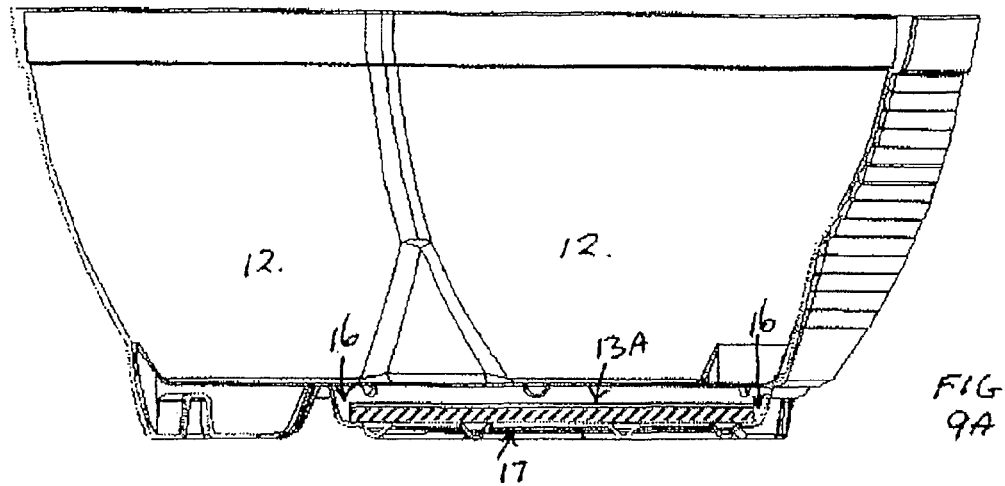
FIG. 9A is a side cross-sectional view of a plant pot with a moisture retaining mat fitted dry state according to a preferred embodiment of this invention.
Figure 9B:
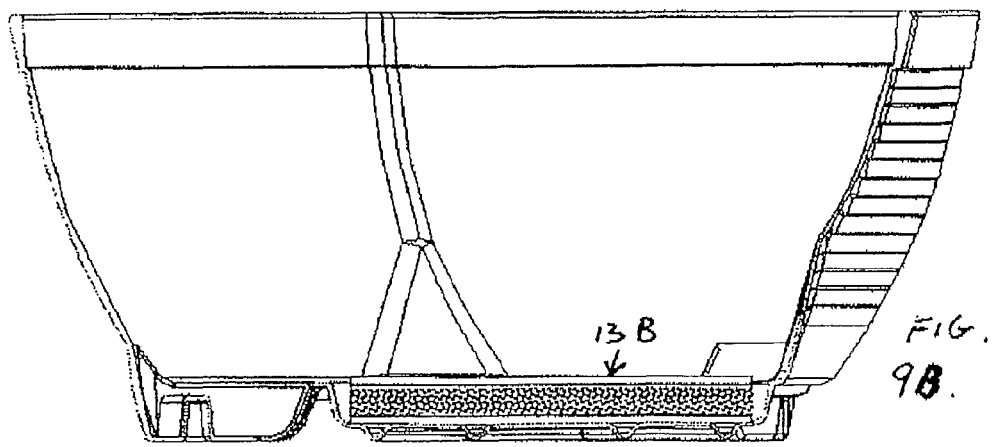
FIG. 9 B is a side cross-sectional view of a plant pot with a moisture retaining mat water activated fitted according to a preferred embodiment of this invention.
Figure 11:
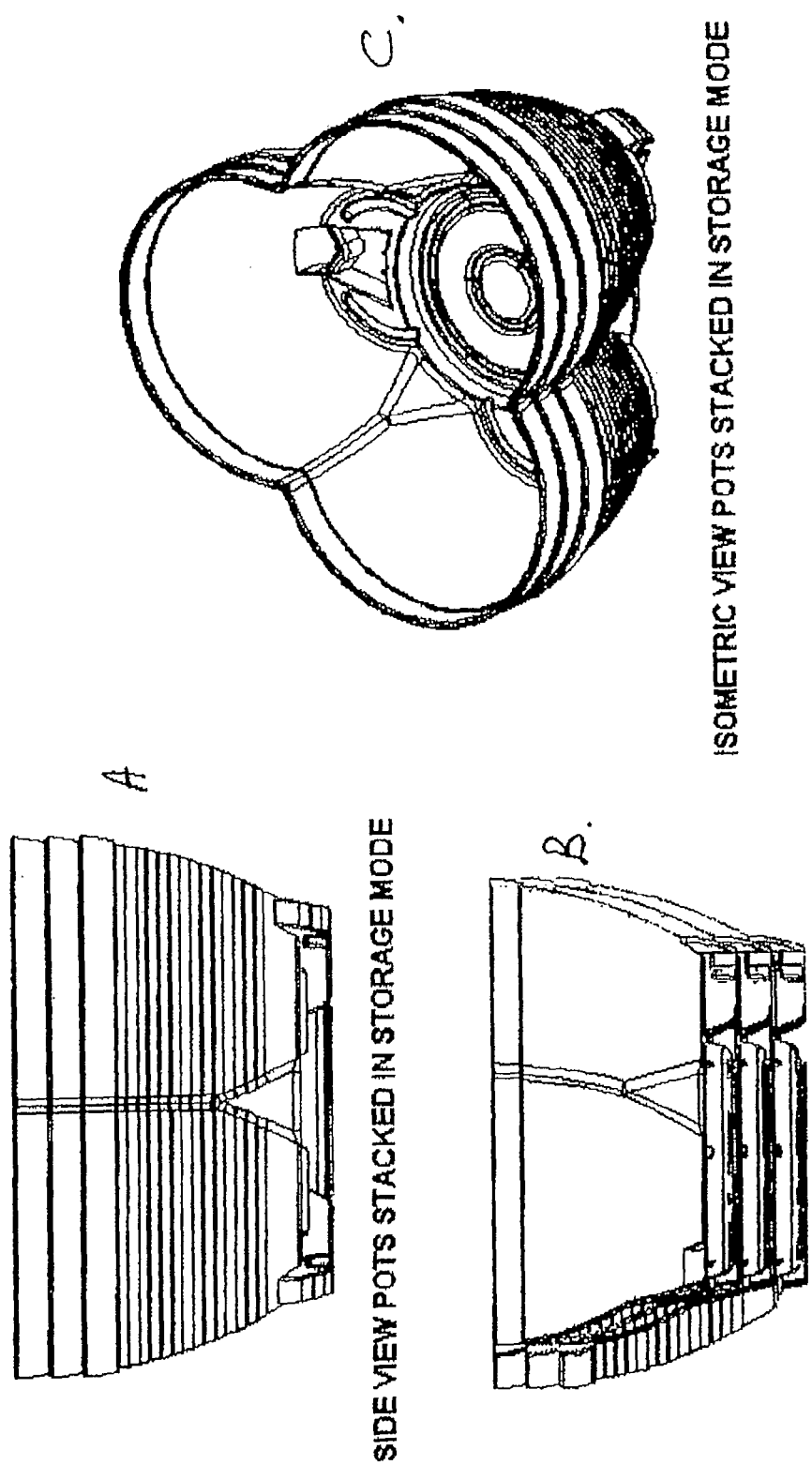
FIGS. 11 A, B AND C depicts the top, side and Isometric views of three pots in storage mode according to a preferred embodiment of this invention.
Figure 12:
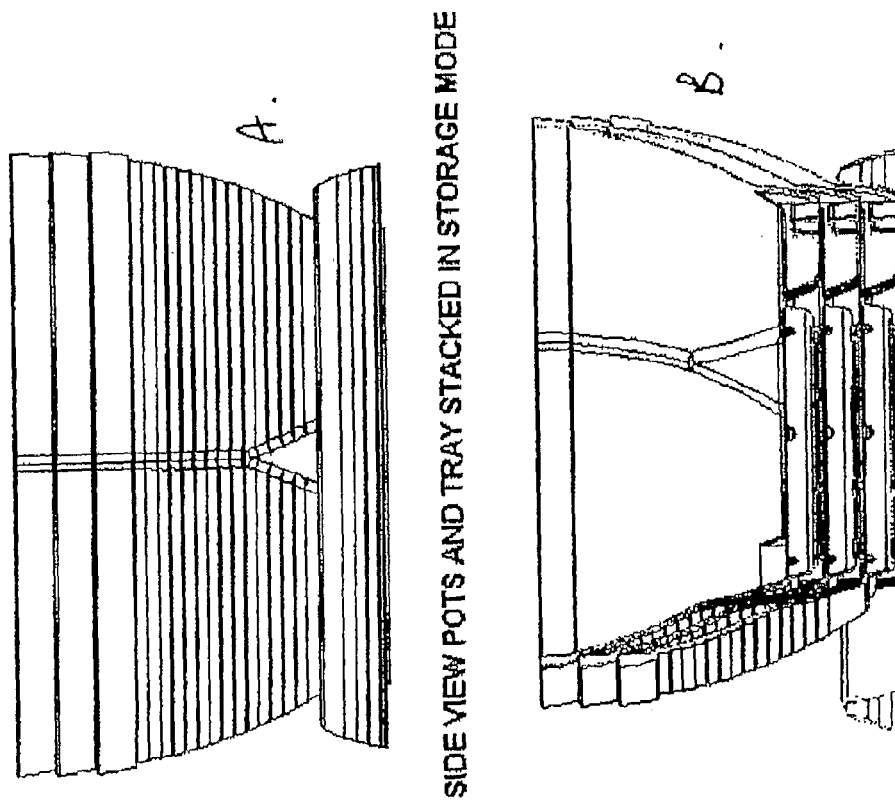
FIGS. 12 A, B AND C depicts the top, side and Isometric views of three pots and a saucer in storage mode according to a preferred embodiment of this invention.

As shown in the diagrams, particularly FIGS. 1 and 2, of the present invention includes a plant pot which, in use, is adapted to be stacked with one or more similar plant pots, said plant pot comprising: a cavity depicted in FIG. 1 with three radially located lobed sub-cavity sections 2 with thickened rim 3 a base portion 4 and side walls 5 a series of water flow directing gutters 6, also referred to as primary water flow directing gutters 6, interconnecting pot leg structures 7 with rapid release drainage holes 8, also referred to as secondary drainage outlet 8, a centrally located water catchment region 9, provided with further water flow directing gutters 10, also referred to as secondary water flow directing gutters 10, and time controlled water flow inhibited excess water drainage slits 11, also referred to as primary drainage outlet 11, a moisture retaining mat working 13 A and B of FIG. 9 in co-operation with the plant pot as shown in FIGS. 9A and 19A B and C and a soil holding region 12 of FIG. 9 located above said moisture retaining mat. This is referenced by Cad drawings FIG. 18

The three radially aligned lobed sub-cavity regions 2 converge with a central cavity defined by walls 14 located immediately above a downward formed recessed water catchment region 9 and become one. The plant pot provides a series of drainage holes 8 through the bottom walls of interconnecting cavities 7 positioned on the base of the radially aligned sub-lobed cavity sections 2 for rapid release of excess water, these interconnecting cavities 7 will be referred to as pot legs hereafter, and have no direct connection with the said catchment region 9. The plant pot also provides drainage gutters 10 incorporating time controlled water flow inhibiting drainage slits 11 within the catchment region 9.

The water catchment region 9 is laterally defined by a side wall or walls 16 and 17 of a downward formed recess centrally located in the bottom of the plant pot cavity as shown in FIG. 9A, within the laterally aligned bottom wall 17 of recessed catchment region 9 is a series of depressions forming gutters 10 with each gutter supporting a plurality of time controlled water flow inhibiting drainage holes 11. Said time controlled water flow inhibiting drainage holes 11 are narrowed slits through the wall of these catchment region 9 drainage gutters 10 allowing a timely inhibited transfer of excess water to escape the catchment region 9 in order to allow the moisture retaining mat 13 A and B working in co-operation with the plant pot-sufficient time to fully absorb to the extent of its capability the maximum amount of storable water. The flow of the primary drainage holes 11 may be altered by adjusting the diameter of the aperture or slit opening. The controlled rate, flow and release may be one liter per hour per one liter of water holding capacity.

The water catchment region 9 provides useable area for the moisture retaining mat 13 to seat securely extending across the entire laterally defined bottom surface 17 of the recess forming the water catchment region 9 but above the catchment region drainage gutters 10 allowing no obstruction of the flow inhibited drainage holes 11.

The purpose of the moisture retaining mat 13 is to store the maximum amount of moisture for an extended period of time and transfer that moisture back into the soil region 12 as the soil draws on this reserve by its own capillary action when needed.

The moisture mat 13 provided may be constructed of any substance or materials that possess super absorbent properties and is provided with an outer skin 18 shown in FIGS. 19 and 20 that has excellent moisture transferring qualities.

In a preferred embodiment of the moisture retaining mat the use of fine grade Potassium Cross-linked Acrylamide Acrylate Co-polymer Gel Crystals impregnated into a non-woven absorbent fibrous inner core 19 which is laminated between two super absorbent outer linings 18 of a resilient material that has excellent moisture transferring qualities.

The fine grade Potassium Cross-linked Acrylamide Acrolith Co-polymer Gel Crystals are super absorbent and can swell to 200 to 400 times their dry state with stored water. The moisture mat 13 will be provided with an add rate of these of fine grade Potassium Cross-linked Acrylamide Acrylate Co-polymer Gel Crystals to sufficiently expand the moisture retaining mat 13 to a depth of the recessed centrally located water catchment region 9 with stored water and as a result provide an enormous expanse of moisture transferring surface spanning the entire water catchment area 9.

In a particular preferred embodiment the plant pot is provided with three interconnecting radially aligned lobed cavity sections 2. Each lobe section preferably defines a (bowl Shaped) sub-cavity 2 of the cavity of FIG. 1 of the plant pot. Each sub-cavity 2 is preferably in open communication with a central cavity region 14. and a pot leg region 7, wherein each lobe section 2 includes a base portion 4 and located on the lower edge and in an underside of said base portion 4 is positioned a box like structure to form the pot leg 7.

Figure 14:
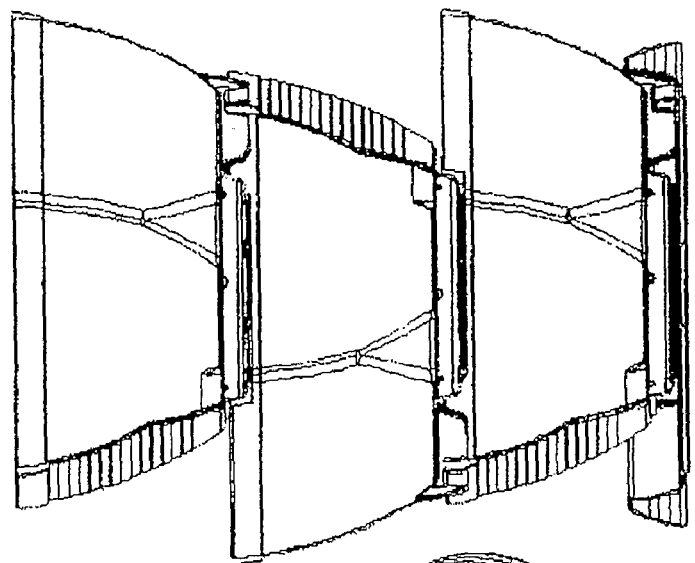
FIG. 14 is a side cross-sectional view of a stack of plant pots and a tray according to a preferred embodiment of this invention.
Figure 15:
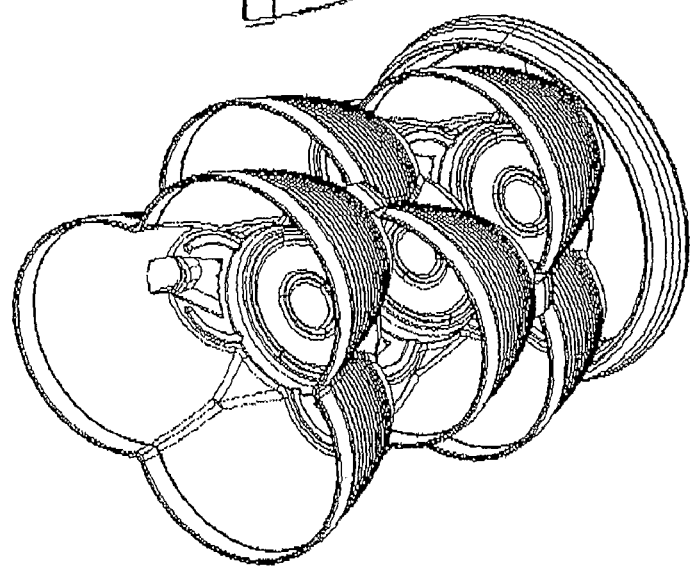
FIG. 15 is a isometric view of a stack of plant pots of FIG. 1 and a tray according to a preferred embodiment of this invention.
Figure 13:
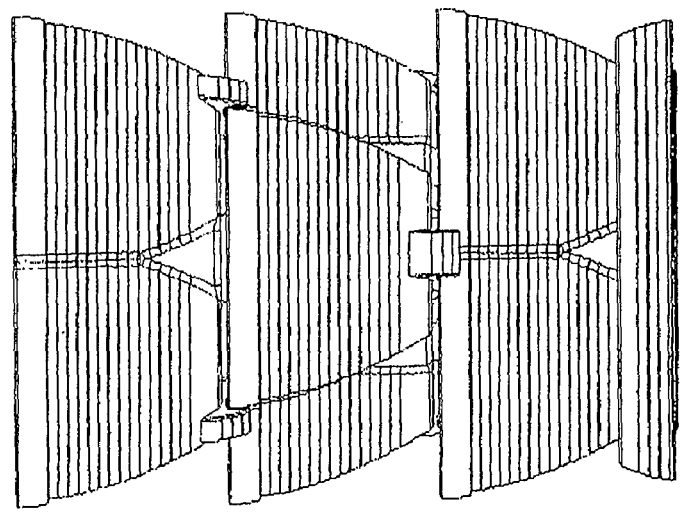
FIG. 13 is a side view of a stack of plant pots of FIG. 1 and a tray according to a preferred embodiment of this invention.

On the underside of this pot leg 7 is a recess 20 and correspondingly at the point of interconnection 21 on the edge of the upper lobed cavity sections includes a broadened wall area forming a thickened rim 3 adapted to be received within the recess 20 on the pot leg 7 section of an upper adjacent plant pot. In this embodiment, a plurality of the plant pots of this invention are adapted to be stacked as shown in FIGS. 13, 14, and 15 so that, in use, the lobe sections of adjoining plant pots are offset.

The broadened wall thickness of the upper lobed sections 3 extends the entire way around the upper rim 3 of the overall cavity of FIG. 1 forming a strong lip 3 to accept the weight of pots stacked above it. In addition further strengthening is created at the interconnection point 22 where the side walls 5 of the radially aligned lobed cavity sections 2 meet the central cavity wall 14 section creating a strengthening brace at that significant stress point 22.

In the preferred embodiment there is provided water flow direction gutters 6 formed by depressions in the internal base portions 4 of the radially aligned lobed sections sub-cavities 2 adjacent to the internal connection between each lobed section sub-cavity 2 and the internal interconnecting cavity formed by each pot leg 7.

These water flow direction gutters 6 follow the contoured edge 23 of the internal base portion 4 of the radially aligned lobed sections sub-cavities 2 and following watering of the plant pot the flow of water is received from the internal wall of the radially aligned lobed sections sub-cavities 2 and directed towards the centrally located recessed water catchment region 9 via the water flow directing gutters 6.

As a consequence the centrally located recessed water catchment region 9 defined by walls 16 and 17 fills with water activating the moisture retaining mat 13A to absorb as much moisture as it can store as shown in 13B and FIG. 18 expanding to a height consistent with the side wall 16 defining the centrally located recessed water catchment region 9 with excess water spilling back out of the catchment region 9 into the water flow directing gutters 6, and forcing the excess water to then overflow into the internal cavities of the pot legs. Here the excess water will then be released from the pots through the rapid release drainage holes 8 located and passing through the inner side wall 24 of the pot legs 7. These secondary drainage holes 8 release the excess water at a fast non-controlled rate. These secondary drainage holes 8 are designed to collectively remove the excess drainage located outside the water catchment region.

Whatever excess water remains in the centrally located recessed water catchment region 9 will be flow inhibited and totally released in a timely fashion after maximum absorption of the moisture retaining mat 13 A and 13 B.

In a further preferred embodiment, the stack of plant pots as Shown in FIGS. 13 14 and 15 further comprises the saucer plate 25 referenced in FIG. 10 adapted to accept the lowermost plant pot of said stack.

Typically this saucer plate 25 will have water retaining capabilities suited for indoor gardening however the saucer plate has easily removable blind drainage holes 26 and will allow full drainage to suit gardening outdoors and prevent the build up of unwanted surplus drainage that may encourage mosquito breeding.

In its entirety the invention encompasses one or more stackable plant pots as Shown in FIGS. 13 14 and 15 in their staked positions each providing a plurality of water flow direction gutters 6, a centrally located recessed water catchment region 9 as defined by walls 16 and 17, a plurality of water catchment drainage gutters 10 supporting a plurality of time controlled water flow inhibited drainage slits 11, a moisture retaining mat 13 A seated on the internal laterally defined base portion 17 of the centrally located recessed water catchment region 9 as defined by walls 16 and 17 to each stacked pot of FIG. 1 and one saucer plate 25 with removable drainage holes 26 seated under the lowermost stacking pot 27 shown in FIG. 13 to form this moisture retaining stackable planting system.

Further more a plurality of said plant pots of FIGS. 1 and 2 and saucers 25 referenced in FIGS. 10 D and E of the preferred embodiments may be located at least partially within each other and thereby able to be stacked for transport, storage and display, thereby realising considerable space savings.

Modifications and improvements to the invention will be readily apparent to those skilled in the art. Such modifications and improvements are intended to be within the scope of this invention.

The invention claimed is:

1. A plant pot provided with internal primary water flow directing gutters and tapering lobed secondary water flow directing gutters, and a water catchment region, wherein the primary water flow directing gutters have a first end in direct communication with an extremity of an outer lobed subcavity of the pot having drainage water, are shaped to collect and direct water to a center cavity of the pot having an epicenter, and have a second end in direct communication with a water catchment region and release the water into the water catchment region, and wherein the secondary water flow directing gutters are in the water catchment region and have an outer lobe in direct communication with the primary water flow gutters and water catchment region having excess water and have an inner lobe in direct communication with a primary drainage outlet wherein the secondary water flow directing gutters are shaped to collect and direct the water in the water catchment region for controlled release by the primary drainage outlet; and wherein the primary drainage outlet crosses the primary water flow gutter and has water drainage slits smaller than rapid release holes of the secondary drainage outlet in order to inhibit the flow of drainage.

2. A plant pot according to claim 1 further comprising a center cavity with the lobed subcavities radially aligned thereto and a base, the internal primary water flow directing gutters in radial alignment with the epicenter wherein the first end of the primary water flow directing gutters is in direct communication with an extremity of the lobed subcavities and the second end of the primary water flow directing gutters is adjacent to the center cavity, an upper soil holding region and a lower recessed water catchment region located within the base of the central cavity wherein the first end of the primary water flow directing gutters is further shaped to collect and guide the flow of drainage water from the extremity of the lobed subcavities toward the second end and to the center cavity, the upper soil holding region, and the lower recessed water catchment region and wherein the lower recessed water catchment region securely retains an independent moisture retaining device.

3. A plant pot according to claim 2 wherein said water catchment region recess extends downwardly from a base of the plant pot and is defined by its own base portion and the entire side wall or walls of the recess formed within the base of the central cavity.

4. A plant pot according to claim 3 wherein the base portion of the recessed water catchment region is provided with a plurality of depressions extending downwardly forming the secondary water flow directing gutters.

5. A plant pot according to claim 4 wherein the secondary water flow directing gutters are in direct communication with the primary drainage outlet at the second end and are shaped to collect and to direct the flow of water to the primary drainage outlet from the first end to the second end of the secondary water flow directing gutters wherein the water drainage slits of the primary drainage outlet inhibit the release of excess drainage from the water catchment region at a controlled rate.

6. A plant pot according to claim 5 wherein the primary drainage outlet passes through the wall of the secondary water flow directing gutters.

7. The plant pot according to claim 5 wherein the water drainage slits are of a size wherein the controlled rate is one liter per hour per one liter of water holding capacity.

8. A plant pot according to claim 6 wherein the recess, the secondary water flow directing gutters and the primary drainage outlet form the water catchment region.

9. The plant pot according to claim 6 wherein the aperture of the water drainage slits is of a size wherein the controlled flow is one liter per hour per one liter of water holding capacity.

10. A plant pot according to claim 8 wherein the plant pot further comprises an independent moisture retaining device seated upon the water catchment recess.

11. The plant pot according to claim 10 further comprising an independent moisture retaining device seated upon the water catchment recess.

12. The plant pot according to claim 10 further comprising an independent moisture retaining device spanning across the water catchment recess.

13. The plant pot according to claim 10 further comprising an independent moisture retaining device cradled within the water catchment recess.

14. A plant pot according to claim 1 further having an internal independent moisture retaining device and wherein the independent moisture retaining device is installed completely within the water catchment region and is of a corresponding shape to nest completely within the water catchment region in perfect alignment with the epicenter, has super absorbent properties and is provided with an upper and lower outer skin that has excellent moisture transferring qualities.

15. A plant pot according to claim 14 wherein the independent moisture retaining device has an upper outer skin that in use is in direct communication with the soil holding region, and is configured to absorb and engorge water temporarily held within the water catchment region with the assistance of the delayed and controlled release of excess water through the primary drainage outlet.

16. A plant pot according to claim 15 wherein the independent moisture retaining device is further engorged with stored water and is configured to transfer moisture to the soil holding region that is in direct communication with its upper outer skin.

17. A plant pot according to claim 16 further comprising interconnecting radially aligned lobed sections intersecting and forming inward facing corners where each lobed section preferably defines a partial bowl shaped sub cavity in open communication with the center cavity, said sub cavity having a lobed horizontal base portion partially encompassed by the first end of the primary water flow directing gutters.

18. A plant pot according to claim 17 wherein the lobed horizontal base portion of the lobed sections is in open communication with an external pot leg structure that has the secondary drainage outlets passing through at least one wall wherein the secondary drainage outlets are shaped to collect and remove the excess drainage water located outside of the water catchment region at a fast non-controlled rate.

* * * * *